United States Patent [19]

Sherman

[11] Patent Number: 4,791,237
[45] Date of Patent: Dec. 13, 1988

[54] CABLE SUSPENSION ASSEMBLY WITH GROUNDING MECHANISM

[75] Inventor: Thomas E. Sherman, Chagrin Falls, Ohio

[73] Assignee: Preformed Line Products Company, Cleveland, Ohio

[21] Appl. No.: 122,029

[22] Filed: Nov. 18, 1987

[51] Int. Cl.[4] .............................................. H02G 7/05
[52] U.S. Cl. .................... 174/40 R; 174/6; 174/78
[58] Field of Search ................. 174/6, 40 R, 71 R, 78, 174/79, 90, DIG. 12; 248/63; 439/92, 98, 99, 100; 24/115 M, 136 R, 136 L; 223/118

[56] References Cited

U.S. PATENT DOCUMENTS

| | | | |
|---|---|---|---|
| 1,163,399 | 12/1915 | Fox | 223/118 |
| 1,477,408 | 12/1923 | Williams | 223/118 |
| 1,792,611 | 2/1931 | Staaf, Jr. | 248/50 X |
| 1,814,831 | 7/1931 | Covey | 248/50 X |
| 1,820,837 | 8/1931 | Smalley | 248/50 |
| 2,004,312 | 6/1935 | Comeau | 24/136 R |
| 2,931,851 | 4/1960 | Sims | 174/72 A |
| 3,007,243 | 11/1961 | Peterson | 248/63 X |
| 3,185,762 | 5/1965 | Shaw | 174/71 R |
| 3,338,608 | 8/1967 | Burns et al. | 174/71 R |
| 3,539,139 | 11/1970 | Eucker | 174/40 R X |
| 3,684,221 | 8/1972 | Bonds | 248/63 |
| 3,794,751 | 2/1974 | Farmer et al. | 174/40 R |
| 4,257,658 | 3/1981 | Hammond et al. | 439/98 |

FOREIGN PATENT DOCUMENTS

| | | | |
|---|---|---|---|
| 1084200 | 7/1954 | France | 248/63 |
| 54-103599 | 8/1979 | Japan | 174/79 |

*Primary Examiner*—Laramie E. Askin
*Attorney, Agent, or Firm*—Fay, Sharpe, Beall, Fagan, Minnich & McKee

[57] ABSTRACT

A grounding mechanism adapted for use with a support assembly suspending an overhead linear member. The grounding mechanism includes first and second leg portions disposed generally perpendicular to each other. The first leg portion has a generally arcuate conformation over its axial length. The second leg portion is angularly disposed relative to the longitudinal axis of the first leg portion so as to extend outwardly from the support assembly through gaps defined between helical rods gripping the linear member. The arcuate conformation of the first leg portion increases in dimension as it extends from a first distal end toward the second leg portion. Reinforcing ribs are disposed at the juncture of the first and second leg portions to strengthen the grounding mechanism. The new grounding mechanism is mounted between the helical rods and the cable within the support assembly. Preferably, higher strength helical rods are disposed adjacent the grounding mechanism and these rods are interspersed with the remainder of the support assembly rods.

19 Claims, 2 Drawing Sheets

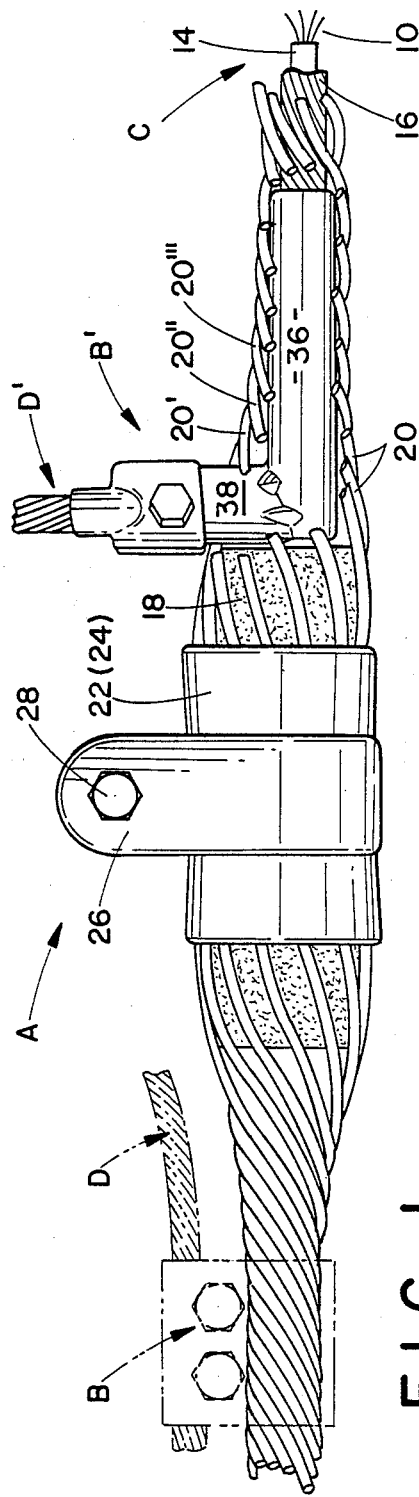
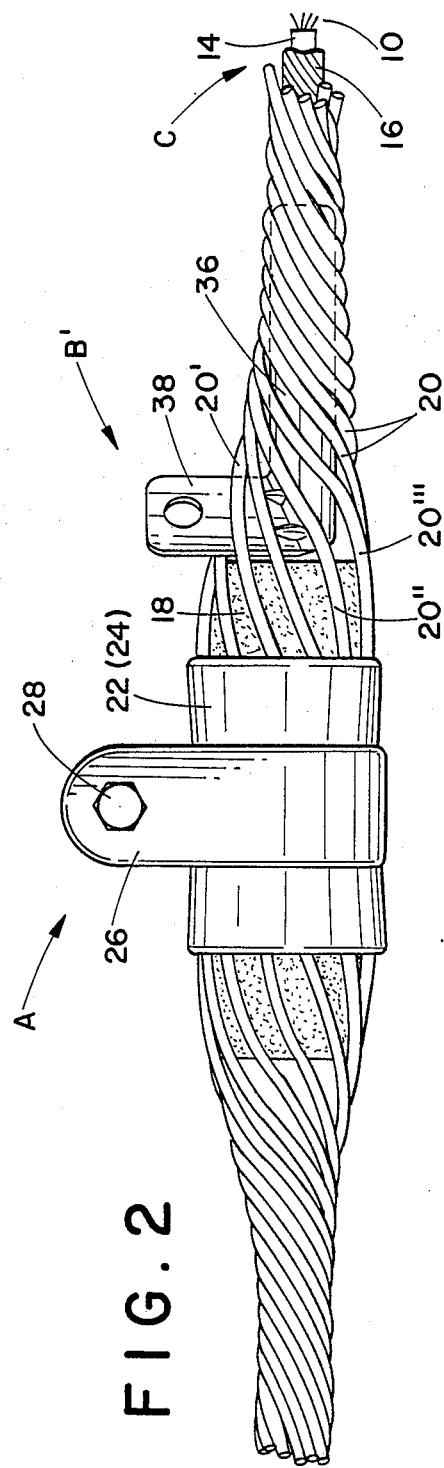

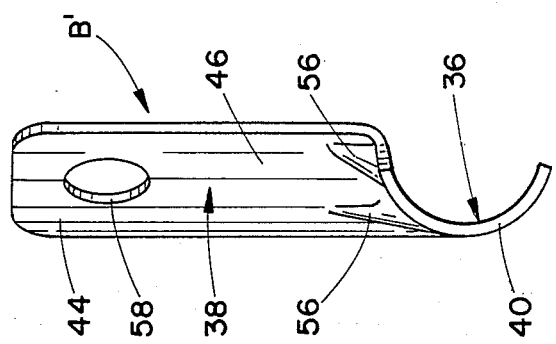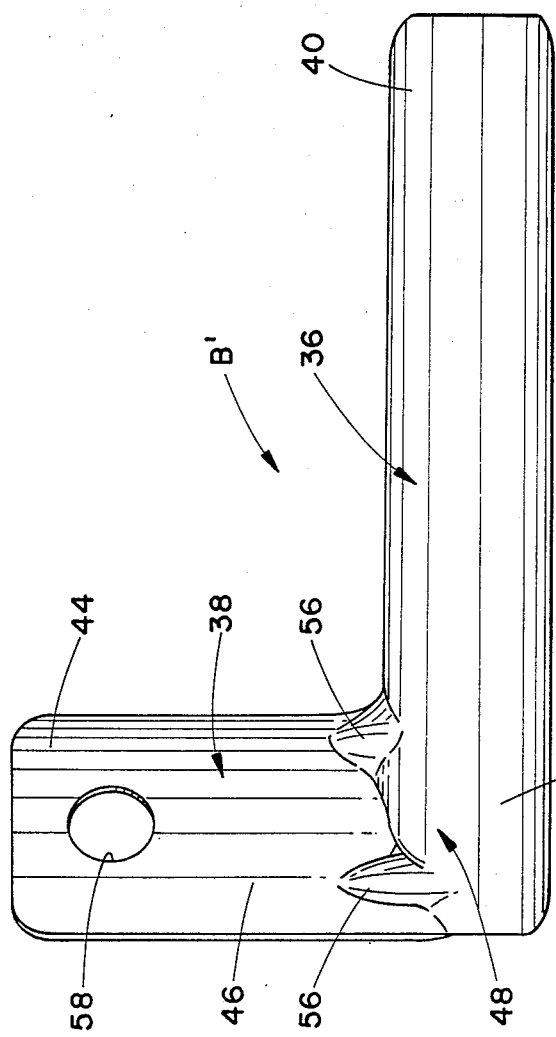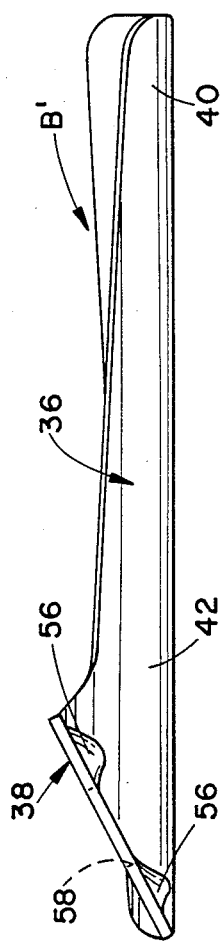

CABLE SUSPENSION ASSEMBLY WITH GROUNDING MECHANISM

BACKGROUND OF THE INVENTION

This invention pertains to the art of grounding assemblies and, more particularly, to a grounding structure utilized with linear members such as overhead cables and the like.

The invention is particularly applicable to grounding a fiber optic cable and will be described with particular reference thereto. However, it will be appreciated that the application has broader applications and may be advantageously employed in connection with many other cable environments and uses.

Commonly assigned U.S. Pat. No. 3,539,139 to Eucker issued Nov. 10, 1970 illustrates and describes a conventional cable support assembly that effectively limits cable vibration and other dynamic cable motion. Briefly, a conductor cable is received between mating cushion members that grip the cable along a predetermined longitudinal segment thereof. Helical rods or wires encompass the cushioning member and extend axially beyond opposed ends of the cushion member to grip the cable. A two part, saddle-like member is received over the helical rods. The saddle-like member is likewise surrounded by a clamping strap interconnected with a suspension arm means through use of a fastening means such as a bolt.

The foregoing conventional support assembly has been widely used in suspending linear bodies such as electrical transmission lines or cable. With the recent advent of and increased emphasis on fiber optic technology, this support assembly is considered highly desirable since it virtually eliminates compression or crushing stresses on a protective aluminum member containing the fragile optical fibers. The elimination of compression stresses protects against unwanted signal loss.

In adapting the support assembly to fiber optic cable, a first set of structural reinforcing rods is wrapped around the fiber optic cable, more specifically around the protective aluminum member or other support structure protecting the individual optical fibers. Thereafter, the above-described support assembly is utilized in much the same manner as is the case for conventional electrical transmission lines or cables. The structural reinforcing rods prevent kinking or bending of the fiber optic cable during unbalanced longitudinal loading conditions. Kinking and bending is also considered undesirable since it may produce signal losses in the optical fibers which might not diminish thereafter when the unbalanced loading is reduced.

Typically, prior art arrangements were grounded through use of a clamp arrangement, the clamp was attached directly to the optical ground wire at an area beyond the ends of the helical rods of the support assembly. This exposed the optical ground wire to potential fatigue failure and also created compressive stresses at the clamping point.

Still another problem associated with fiber optic cables is the need to increase or enhance current transfer to reduce the heat level associated with a high magnitude fault condition. The increased heat level has a deleterious effect on the optical components, thus necessitating an increase in current transfer.

The present invention contemplates a new and improved grounding mechanism which overcomes the above-referenced problems and others, and provides a simple, easily installed grounding arrangement.

SUMMARY OF THE INVENTION

In accordance with the present invention, a grounding mechanism is provided adapted for use with an overhead cable suspended by a support assembly utilizing helical rods to grip the periphery of the cable. The grounding mechanism includes first and second leg portions disposed in generally perpendicular relation to each other. One of the leg portions is adapted for receipt intermediate the helical rods and cable.

According to another aspect of the invention, the first leg portion has a generally arcuate cross-section for conforming with the periphery of the associated cable.

According to a further aspect of the invention, the second leg portion is angularly disposed relative to a central longitudinal axis of the first leg portion of outwardly radial extension between adjacent helical rods.

According to yet another aspect of the invention, the circumferential extent of the arcuate conformation of the first leg portion varies along its longitudinal extent.

In accordance with still another aspect of the invention, high strength helical rods are interspersed adjacent the grounding mechanism to facilitate mounted retention of the grounding mechanism in a support assembly.

A principal advantage of the invention is the enhancement of current transfer to ground during a high magnitude fault condition, lightning strikes, and other current flows.

Another advantage of the invention is realized by the reduced heat level through use of the grounding mechanism.

Still another advantage of the invention resides in the simple, yet effective configuration of the grounding mechanism and its interrelationship with a conventional support assembly.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof, and wherein:

FIG. 1 is a side elevational view of a support assembly with selected portions broken away to illustrate the position and cooperation of the subject new grounding mechanism therewith, and with a conventional grounding mechanism being shown in phantom at one end of the support assembly even through prior arrangements are disposed away from the support assembly;

FIG. 2 is a side elevational view of the subject invention as incorporated into a support assembly;

FIG. 3 is a side elevational view of the subject new grounding mechanism;

FIG. 4 is an end view of the grounding mechanism taken from the right-hand end of FIG. 3; and, FIG. 5 is top plan view of the grounding mechanism of the subject grounding mechanism.

DETAILED DESCRIPTION OF THE PREFERRED EMBODIMENT

Referring now to the drawings wherein the showings are for purposes of illustrating the preferred embodiment of the invention only and not for purposes of limiting same, FIG. 1 shows a support assembly A incorporating a known ground mechanism B to adequately ground a linear member or cable. FIG. 1 also shows the subject new ground mechanism B' which is particularly adapted for use in grounding fiber optic cable C.

More particularly, fiber optic cable C includes a plurality of optical fibers 10 encased in an elastomeric or plastic material and further shielded by an aluminum member 14. Other structural arrangements are used as substitutes for the aluminum tubular member 14 and for purposes of the following discussion, one skilled in the art will understand the adaptation of the subject invention to those alternate arrangements. The fragile nature of the fiber optic cable dictates that virtually all compression and crushing stresses on the aluminum member be limited so as to minimize signal loss. Nevertheless, it is necessary to support the fiber optic cable at selected points along its axial length. In an effort to inhibit the compression and crushing stresses, structural reinforcing rods 16 are wrapped around the fiber optic cable. The reinforcing rods have a helical conformation of conventional construction. Typically, plural reinforcing rods are used to substantially encompass the entirety of the fiber optic cable. The rods are also disposed in a common lay direction, i.e., all right-hand or left-hand helices. As is known, the structural reinforcing rods prevent kinking or bending of the fiber optic cable during unbalanced longitudinal loading conditions, typically associated at a support region. As already indicated, any such kinks or bends may produce unwanted losses in the transmissibility capabilities of the optical fibers, and these losses may not diminish once the loading unbalance is removed.

Continuing with reference to FIG. 1, a conventional support assembly includes a cushion member 18 typically formed as a pair of mating elements that receive the structural reinforcing rods 16 therethrough. Helical rods or wires 20 are received over the cushion member and structural reinforcing rods. The helical rods also entirely surround the reinforcing rods but as they extend over the larger diameter cushion member become circumferentially separated to accommodate the increase in diameter. As illustrated, the helical rods have the same lay or angle of twist as the reinforcing rods. The helical rods normally will not extend along the full axial length of the structural reinforcing rods but terminate short of the ends. Of course, one of ordinary skill in the art will understand that the axial extent of the helical rods relative to the reinforcing rods may vary with varying parameters. A pair of mating saddle-shaped gripping members 22, 24 are received around the helical rods and themselves retained within a generally U-shaped strap 26. The strap retains the various components of the support assembly together and interconnects them with a support structure (not shown) through a fastening arrangement such as a conventional nut and bolt type fastener 28. A ground wire D is shown as being connected to conventional ground mechanism B, and a ground wire D' is shown as being connected to the subject new ground mechanism B'.

In FIG. 1, the ground mechanism B' of the subject invention is shown as being defined by a generally L-shaped member having a first leg portion 36 and a second leg portion 38. The first leg portion is preferably substantially longer than the second leg portion but other dimensional relationships can be utilized without departing from the scope and intent of the subject invention. With particular reference to FIGS. 3-5, the first leg portion includes a first or outer distal end 40 and a second end 42. Likewise, the second leg portion has a first or outer distal end 44 and a second end 46. The second ends 42, 46 of the respective leg portions are integrally joined at an interconnecting or merging area 48.

The first leg portion has a generally arcuate cross-sectional conformation as particularly illustrated in FIG. 4. The arcuate conformation extends along the entire longitudinal dimension or extent of the first leg portion and is adapted for substantial mating engagement with the outer periphery of the structural reinforcing rods that surround the fiber optic cable or the outer periphery of a conventional conductor cable.

As is more clearly apparent in FIG. 5, the wraparound or circumferential extent of the arcuate conformation varies along the longitudinal extent of the first leg portion. More specifically, the circumferential coverage preferably increases as the first leg portion extends from minimum coverage at its first end toward maximum coverage at its second end. This assures that a greater area of the cable is encompassed at an area adjacent the second leg portion and, more importantly, that a greater surface area of the grounding mechanism is retained adjacent the second leg portion to which a grounding wire is connected.

The second leg portion, as indicated above, extends generally perpendicularly or radially from the first leg portion. The plane defined by the second leg portion is also angularly disposed with respect to the central axis of the first leg portion. As is apparent in FIG. 2, the angular orientation of the second leg portion permits its extension radially outward between contiguous helical rods of the support assembly. The entire first leg portion is tightly retained between the cable and helical rods. On the other hand, a substantial amount of the second leg portion extends radially outward through a gap region defined between contiguous helical rods. Therefore, the angular orientation of the second leg portion must be preselected so that it remains generally parallel to the lay direction of the helical rods at the gap regions inherently defined at the increased diameter of the cushion member. Further, the second leg portion is generally planar to reduce manufacturing costs, and accommodate extension through the gap region. Other conformations could, however, be used to advantage within the scope and intent of the subject invention.

The merging area 48 of the first and second leg portions includes strengthening ribs or protrusions 56. The ribs resist inadvertently imposed torque on the second leg portion to prevent or limit deflection relative to the first leg portion. Still further, means for fastening such as aperture 58 is provided in the distal end 44 of the second leg portion. This aperture facilitates connection with the ground wire D' in a well known manner.

Yet another feature of the grounding mechanism is the inclusion of high strength helical rods 20', 20", 20''' as shown in both FIGS. 1 and 2. A preselected number of the helical rods can be utilized to maintain a firm, gripping engagement of the grounding mechanism. Oftentimes, the helical rods are formed of aluminum and have proved to be fully adequate for the support assembly. The potential for increased loads resulting from inclusion of the grounding mechanism at a location exterior of the cable and beneath the helical rods requires provision for increased strength. Here, special alloy wires are utilized to provide increased strength, particularly in areas affected by the imposition of increased stresses resulting from inclusion of the grounding mechanism into the support assembly. The particular number of high strength rods can vary as necessary.

According to the method of installing the ground mechanism, it is apparent from the above description that the first leg portion is axially aligned with the longitudinal axis of the linear member or fiber optic cable. The first leg portion is radially interposed between the helical rods and either the reinforcing rods used with the fiber optic cable or the conductor cable of an electrical transmission line. The second leg portion is directed radially outward between contiguous helical rods and typically extends in the same direction as the U-shaped strap 26. In this manner, the ground mechanism is easily connected to the ground wire associated with the support structure. In still other arrangements, the second leg portion can extend downwardly or away from the strap if required.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is now claimed:

1. In combination:
   a cable support assembly receiving a cable therethrough and gripping the cable periphery by means of a plurality of helical elements and wherein a bracket is disposed in generally surrounding relation to said helical elements; and,
   a grounding mechanism operatively associated with said cable support assembly and cable, said grounding mechanism including a first leg portion having a generally arcuate conformation defined along a central longitudinal axis, said first leg portion generally conforming to said cable and having a first distal end and a second end;
   said grounding mechanism further including a second leg portion having an outer distal end and an inner end interconnecting with said first leg portion in generally perpendicular relation.

2. The combination as defined in claim 1 wherein said second leg portion is angularly disposed relative to the central longitudinal axis.

3. The combination as defined in claim 1 further comprising means adapted for securing said grounding mechanism to an associated ground wire, said securing means being disposed adjacent said outer distal end.

4. The combination as defined in claim 1 wherein the arcuate conformation of said first leg portion increases in dimension from said first distal end toward said second end.

5. The combination as defined in claim 1 wherein said grounding mechanism is interposed between said cable and helical elements.

6. The combination as defined in claim 1 wherein a preselected number of said helical elements have a higher strength than the remainder of said helical elements.

7. The combination as defined in claim 1 wherein said grounding mechanism is interposed between said cable and helical elements and a preselected number of said helical elements adjacent said grounding mechanism have a higher strength than the remainder of said helical elements.

8. A cable suspension assembly comprising:
   a plurality of helical elements adapted to receive a cable therethrough and grip the cable periphery;
   a bracket operatively engaging said helical elements and adapted to secure the cable to an associated support; and,
   a grounding mechanism having a first leg portion positioned within said helical elements and a second leg portion engaging said first leg portion, said second leg portion extending outwardly from the helical elements for operative connection with an associated ground wire.

9. The cable suspension assembly as defined in claim 8 wherein said fist leg portion has a generally arcuate conformation defined along a central longitudinal axis.

10. The cable suspension assembly as defined in claim 9 wherein said second leg portion is angularly disposed relative to the central longitudinal axis.

11. The cable suspension assembly as defined in claim 8 wherein said first leg portion is dimensioned to generally conform to the periphery of a cable.

12. The cable suspension assembly as defined in claim 8 further comprising means adapted for securing said grounding mechanism to an associated ground wire, said securing means being disposed adjacent a first distal end of said second leg portion.

13. The cable suspension assembly as defined in claim 12 wherein said securing means includes an aperture in said second leg portion.

14. The cable suspension assembly as defined in claim 8 wherein said first leg portion has a generally arcuate conformation that increases in dimension as it extends along a longitudinal axis.

15. The cable suspension assembly as defined in claim 8 wherein said bracket is disposed in generally surrounding relation to said helical elements.

16. The cable suspension assembly as defined in claim 8 wherein a preselected number of said helical elements have a higher strength than the remainder of said helical elements.

17. The cable suspension assembly as defined in claim 8 wherein said first and second leg portions define a generally L-shaped member.

18. The cable suspension assembly as defined in claim 8 wherein said grounding mechanism first leg portion has a generally arcuate conformation that varies as it extends along a longitudinal axis.

19. The cable suspension assembly as defined in claim 8 further comprising reinforcing means disposed at a juncture between said first and second leg portions.

* * * * *